United States Patent
Shi et al.

(10) Patent No.: US 8,494,075 B2
(45) Date of Patent: Jul. 23, 2013

(54) SINGLE STREAM PHASE TRACKING DURING CHANNEL ESTIMATION IN A VERY HIGH THROUGHPUT WIRELESS MIMO COMMUNICATION SYSTEM

(75) Inventors: Kai Shi, Sunnyvale, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 12/869,521

(22) Filed: Aug. 26, 2010

(65) Prior Publication Data

US 2012/0051476 A1    Mar. 1, 2012

(51) Int. Cl.
*H04L 1/06*    (2006.01)

(52) U.S. Cl.
USPC ........................................................ 375/267

(58) Field of Classification Search
USPC ............... 370/208, 252, 310, 312, 330, 334, 370/338; 375/148, 260, 267, 295, 299, 340, 375/354; 455/63.1, 101, 132, 444
See application file for complete search history.

(56) References Cited

U.S. PATENT DOCUMENTS

| | | | |
|---|---|---|---|
| 7,408,976 B1 | 8/2008 | Narasimhan et al. | |
| 2002/0065047 A1 | 5/2002 | Moose | |
| 2005/0141626 A1* | 6/2005 | Lee et al. | 375/260 |
| 2005/0152314 A1 | 7/2005 | Sun et al. | |
| 2008/0090575 A1 | 4/2008 | Barak et al. | |
| 2010/0309834 A1* | 12/2010 | Fischer et al. | 370/312 |

FOREIGN PATENT DOCUMENTS

EP    1040593 A1    10/2000

OTHER PUBLICATIONS

International Search Report and Written Opinion—PCT/US2011/049405—ISA/EPO—Dec. 22, 2011.

* cited by examiner

*Primary Examiner* — Sam K Ahn
*Assistant Examiner* — Shawkat M Ali
(74) *Attorney, Agent, or Firm* — Bever, Hoffman & Harms, LLP (57) ABSTRACT

In a multiple-input, multiple-output system, the wireless node's receive chain demodulation function is enhanced to include phase tracking. Instead of performing phase tracking during the data symbols which is cumbersome for very high throughput wireless networks, the VHT Long Training Fields (LTFs) embedded in the preamble of a frame are used for phase tracking. Single stream pilot tones are added during the transmission of VHT-LTFs. This is exploited on the receive side to be able to estimate the channel using the pilot tones in the first set of the Long Training Fields. Second set of the Long Training Fields are then used to estimate the phase of the pilot tones using the estimated channel. The phase estimation so obtained is continuously applied to other received data tones throughout the VHT-LTFs of the data symbols. The phase errors due to PLL mismatches and phase noise are reduced at reception, leading to better signal to noise ratio for different levels of parts per million drift and offset in frequency. Further, MIMO channel estimation is more accurate, which improves the overall wireless network when this accurate MIMO channel estimation data participates in calibration and handshake between wireless nodes.

18 Claims, 8 Drawing Sheets

FLOW CHART OF PREAMBLE AND VHT_LTF BASED PHASE CORRECTION

WIRELESS TRANSMIT AND RECEIVE WITH PHASE TRACKING

FIG. 3

WIRELESS NODE TO NODE COMMUNICATION

FIG. 4

PHASE TRACKING AND CORRECTION BLOCK DIAGRAM

SINGLE STREAM PHASE TRACKING DURING CHANNEL ESTIMATION IN A VERY HIGH THROUGHPUT WIRELESS MIMO COMMUNICATION SYSTEM

FIELD

This invention relates generally to communication systems. In particular, it advances better communication of information through wireless communication systems by phase tracking using pilot tones embedded in the preamble of transferred frames.

BACKGROUND

Advances in internet usage are leading to bandwidth demand increase in all sections of the network. One such advance has been in the wireless local area network (LAN) area. Demand for wireless LAN has experienced phenomenal growth. This demand has been driven by users connecting notebook computers to networks at work or at mobile gathering places, among others. Growth has extended beyond the PC as well. Consumer applications like music streaming, internet telephony, gaming and in-home video transmission are also fueling growth in bandwidth.

These demand increases on wireless LAN have spurred extensive standards development in the technical area. Several wireless communications standards such as the Institute of Electrical Engineers (IEEE) 802.11 standard have emerged. IEEE 802.11 denotes a set of wireless local area network (WLAN) air interface standards for short-range communications ranging from tens of meters to a few hundred meters. One such WLAN standard is 802.11b. This standard specifies raw data rates up to 11 Mbps using modulation techniques of Complementary Code Key (CCK) and/or Direct-Sequence Spread Spectrum (DSSS). The 802.11a standard, defined contemporaneously with 802.11b, uses a more efficient method of transmission called Orthogonal Frequency Division Multiplexing (OFDM). The 802.11a standard enabled data rates up to 54 mbps, but due to incompatible radio frequency band of 5 GHz, as compared to 2.4 GHz for 802.11b, this standard was not widely deployed. In mid-year 2003, IEEE ratified 802.11g, which applied OFDM modulation to the 2.4 GHz band. Much of WLAN client hardware supported both 802.11a and 802.11g.

The follow on generation in the development of standards is 802.11n. The 802.11n standard provides for a variety of optional modes that dictate different maximum rates. The standard allows manufacturers to tune capabilities to offer different price points and performance. The 802.11n standard offers raw data rates up to 600 Mbps, while a 300 Mbps speed device could also be built consistent with 802.11n specification.

The 802.11n standard improves OFDM implementation using a higher maximum code rate and higher bandwidth. It improves the raw rate from 54 Mbps to 65 Mbps. Further, one of the widely known components of the standard is a Multiple Input Multiple Output or MIMO. MIMO exploits a radio phenomenon called multi-path. Multi-path involves transmitted information bouncing off doors, walls and other objects. This information reaches the receiving antenna multiple times through different paths and at slightly different times.

Multi-path degrades wireless performance if it is not controlled. MIMO technology, adopted in 802.11n standard, usefully deploys multi-path through space division multiplexing (SDMA). The WLAN transmitter device splits the data stream into multiple parts, called spatial streams. Each spatial stream is transmitted through separate antennas to corresponding antennas on the receiver. The 802.11n supports up to 4 spatial streams. While doubling or quadrupling the spatial stream leads to increase in raw data rates, the cost and power also tend to increase due to increased processing required per antenna pair. A MIMO system is characterized by the number of transmitter antennas by the number of receiver antennas. A 4×4 MIMO, for example, has four antennas on the transmitter and 4 antennas on the receiver.

MIMO performance can be improved by beam-forming and diversity. Beam-forming directs the radio signal on to the target antenna. This improves range and performance by limiting interference. Diversity exploits multiple antennas by combining the outputs of or selecting the best subset of a larger number of antennas than required to receive a certain number of spatial streams. Excess antennas may be used to say combine multiple received streams to one stream, operating over longer range. Similar trade offs may be made for increasing raw data rates, with a fixed range.

The 802.11n standard, in summary, advances wireless LAN (WLAN) through better OFDM characteristics, space division multiplexing through MIMO, diversity, power saving methods, doubling of channel from 20 MHz to 40 MHz, MAC level aggregation of overhead, and reduced inter frame space.

In the follow on standards, referred to as 802.11 for Very High Throughput (VHT) at 5 GHz band, the RF bandwidths targeted are up to 160 MHz and data rates are up to 6.933 Gbps. More efficient signal processing schemes are being deployed to reduce noise and improve the signal to noise ratio. Traditionally, pilot tones in the data symbols have been used to perform phase tracking during data symbols, but for 802.11n and above generations, this is compute costly and not feasible during MIMO channel estimation. The pilot tones as defined in 802.11n for the Long Training Fields (LTFs) vary from stream to stream and therefore cannot be used for accurate phase tracking.

For a 5 GHz carrier frequency, a 2 parts per million drift amounts to a frequency drift of 100 KHz. This frequency drift, with 4 symbols, amounts to a phase rotation of 5 degrees. For eight symbols, this doubles to 10 degrees. In OFDM, since the signal is carried in the phase, a phase drift leads to lower signal to noise ratio. This phenomenon makes the wireless network degrade on both performance and throughput.

SUMMARY

Embodiments of the present invention pertain to phase tracking using pilot tones in the preamble of the frame for a MIMO wireless communication system.

In one embodiment, similar to pilot tones in the data symbols, pilot tones in VHT-LTFs can be defined for phase tracking. Unlike the data tones, the MIMO training mapping cover sequence matrix (commonly referred to as a P matrix) is not applied to the pilot tones during channel estimation based on pilot tones. Instead, single stream pilots are mapped to all space times stream (STS). In this embodiment, the pilot tones in the first VHT-LTF are used for initial one dimensional channel estimation. The pilot tones in the other remaining VHT-LTFs are used to estimate phase rotation based on pilot tones and the initial one dimensional channel estimation. The derived and consolidated information is used for MIMO channel estimation for data tones.

In one embodiment of the present invention, a method and apparatus is disclosed to use training fields in the header of a transmitted frame to estimate, on reception, the channel and the phase errors. This information is then applied to data tones to improve throughput and performance.

BRIEF DESCRIPTION OF THE DRAWINGS

The accompanying drawings are incorporated in and form a part of this specification. The drawings illustrate embodiments. Together with the description, the drawings serve to explain the principles of the embodiments.

DETAILED DESCRIPTION

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Figure 1:
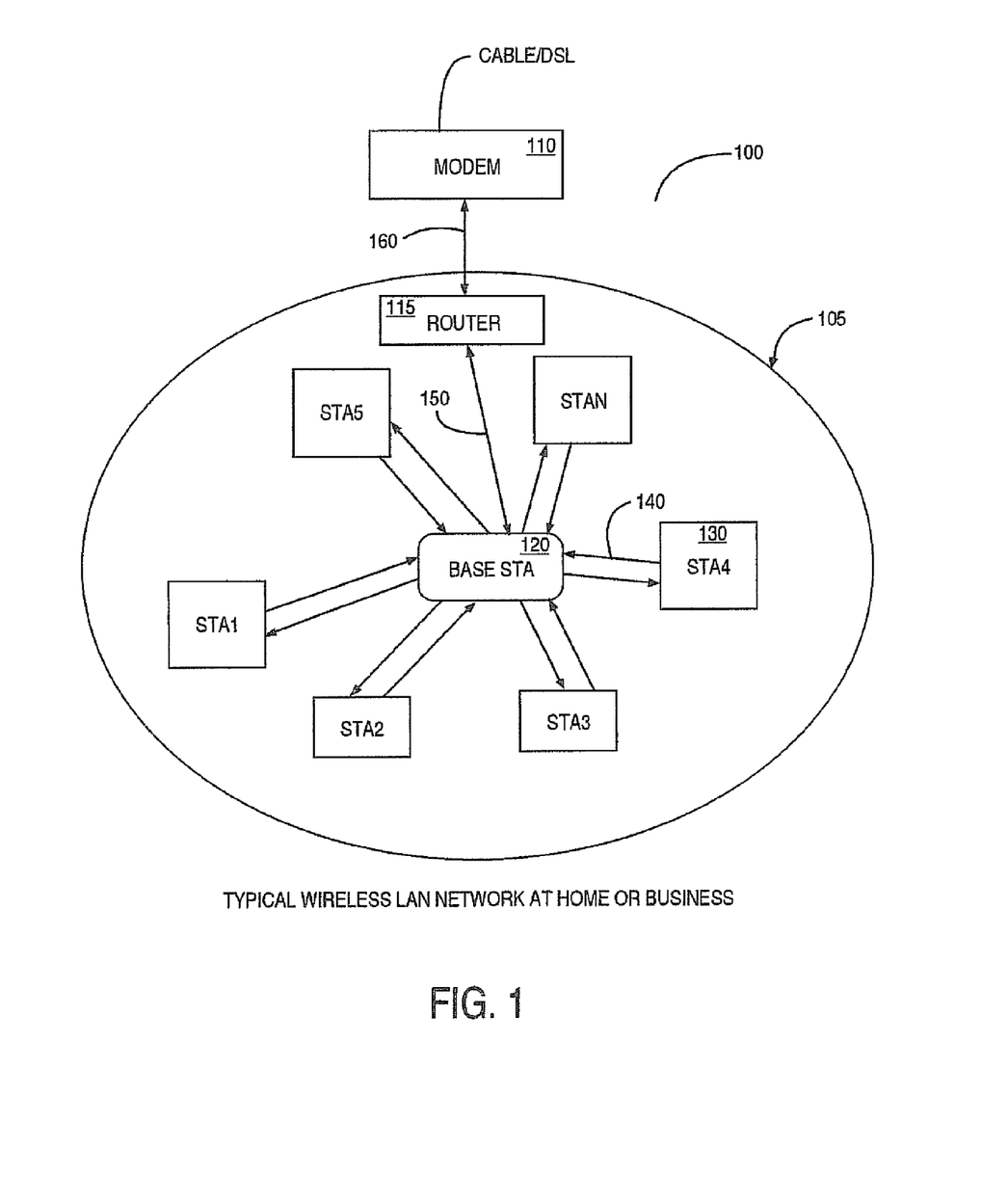
FIG. 1 is a block diagram showing a typical Wireless LAN network in a home or small business application.

FIG. 1 100 is a block diagram of a typical wireless LAN network 105 deployed at home or business. Several users are represented by stations 130 among others. Stations are capable of receiving and transmitting data from and to a base station 120. A wireless Access Point (AP) is one embodiment of the base station. The base station 120 communicates with a router 115 through a wire or wirelessly. The router 115 has network connectivity information on the network and receives and forwards packets based on the source and destination addresses. A router has a plurality of ports for connections and a single uplink port to connect to the rest of the internet through a cable modem 110, generally through a wire 160. A cable modem connects to the world wide internet through a Cable Modem Termination System (CMTS) located in a central office of the service provider. Primarily, this invention deals with the wireless communication 140 between a station 130 and base station 120. The new 802.11 VHT standard proposes to transport data raw rates up to 6.933 Gbps wirelessly and reliably over the air.

Figure 2:
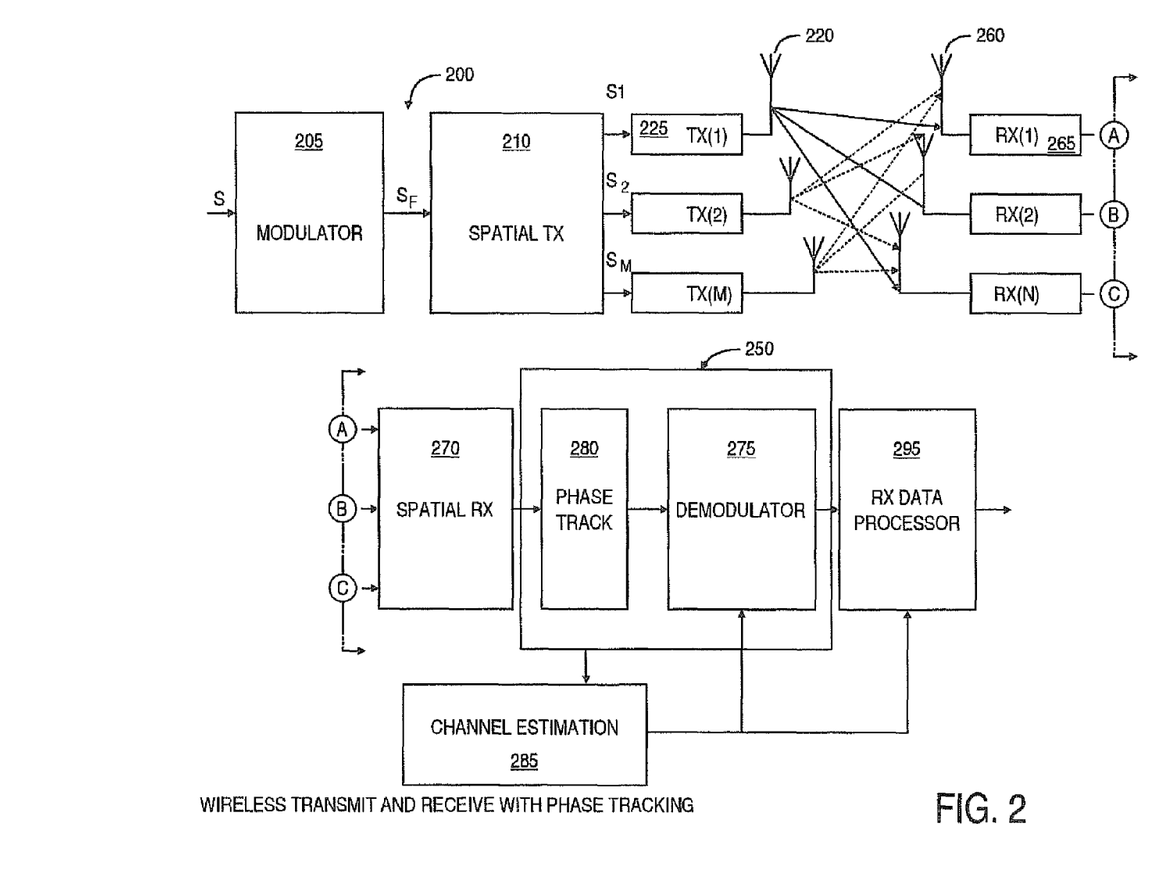
FIG. 2 is a block diagram illustrating a wireless transmission and reception node and its components communicating through M transmit and N receive antennas.

FIG. 2 is a block diagram of a wireless transmission and reception node complex 250. A "to be transmitted" stream S is prepared based on payload data and it is encoded with a preamble and other information before being fed into an encoder and modulator block 205. The node complex consists of M antennas 220 in the transmit direction and N antennas 260 on reception to form a M by N MIMO System. The node complex, while operating in the MIMO mode, may use, in one embodiment, spatial division multiplexing (SDMA) to communicate with several receivers. SDMA enables multiple streams transmitted to different receivers at the same time to share the same frequency spectrum. Within any stream, there are data packets that contain both payload data and a preamble.

Simultaneous multiple stream transmission leads to higher bandwidth. To achieve simultaneity, each data stream is spatially pre-coded and then transmitted through a different transmit antenna. This spatial pre-coding and processing is done by block 210. This results in a sequence of code symbols which are mapped to a signal group to produce a sequence of modulation symbols.

The MIMO System may support a number of modulation schemes, including Orthogonal Frequency Division Multiplexing. OFDM is a spread spectrum technique. It distributes data over a number of sub-carriers spaced apart at precise frequencies. The spacing is orthogonal and enables a receiver to recover data. This modulation technique may be employed using any wireless standard including 802.11ac VHT. The OFDM modulator 205 splits the modulation symbols into a number of parallel streams. An inverse FFT is performed on each set of sub-carrier to produce time domain OFDM symbols. The OFDM symbols are distributed in the payloads of multiple data packet. A preamble is carried along with the payload in each data packet. The preamble comprises several symbols which are split into parallel streams similar to data. The preamble is appended to the data payload prior to spatial processing. Different spatial streams are transmitted through a plurality of antennas using RF transceivers 225.

The transmitted information is received on a plurality of antennas 260. This is fed into transceivers 206 to recover the information modulated on RF carriers. The recovered information is provided to receive spatial processor 270. Data carried on any spatial streams are recovered. A preamble processor uses the preamble to provide synchronization information to OFDM demodulator and other downstream processing. The OFDM demodulator 275 converts the stream from time domain to frequency domain using Fast Fourier Transform (FFT). The frequency domain includes a stream per sub-carrier. The channel estimator 285 receives the stream and estimates the channel response. As part of the preamble, there are pilot tones which are phase shifted due to transmission through a wireless channel. This is due to relative frequency residual offsets between the PLLs at reception and transmission. The shift is generally a linear shift. Another phase shift occurs due to phase noise.

Figure 3:
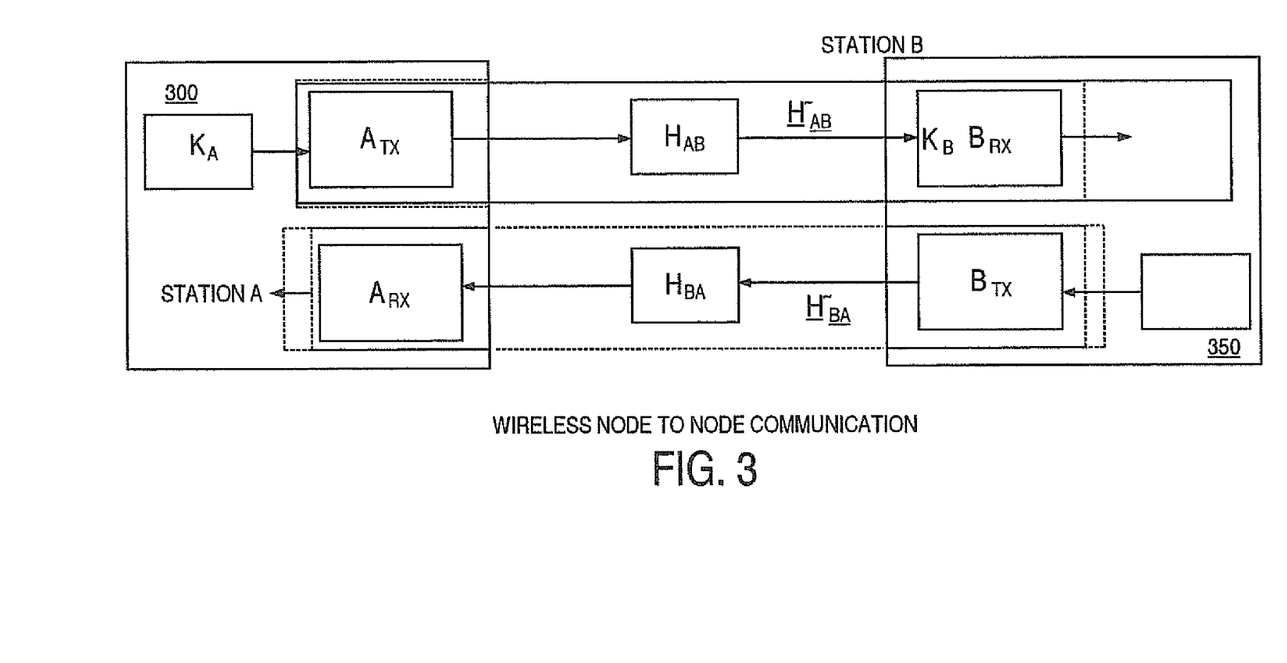
FIG. 3 is an exemplary frame structure for a Physical Layer Convergence Protocol (PLCP) frame used in wireless communications.

FIG. 3 represents a bidirectional node to node communication between station A 300 and station B 350. The wireless channel between A and B is mathematically modeled by channel response matrix $H_{AB}$, while the same in the other direction is modeled by matrix $H_{BA}$. Through proper handshake and possible calibration, both stations compute correction matrix $K_A$ and $K_B$ to effectuate a reliable and high throughput wireless transmission.

Figure 4:
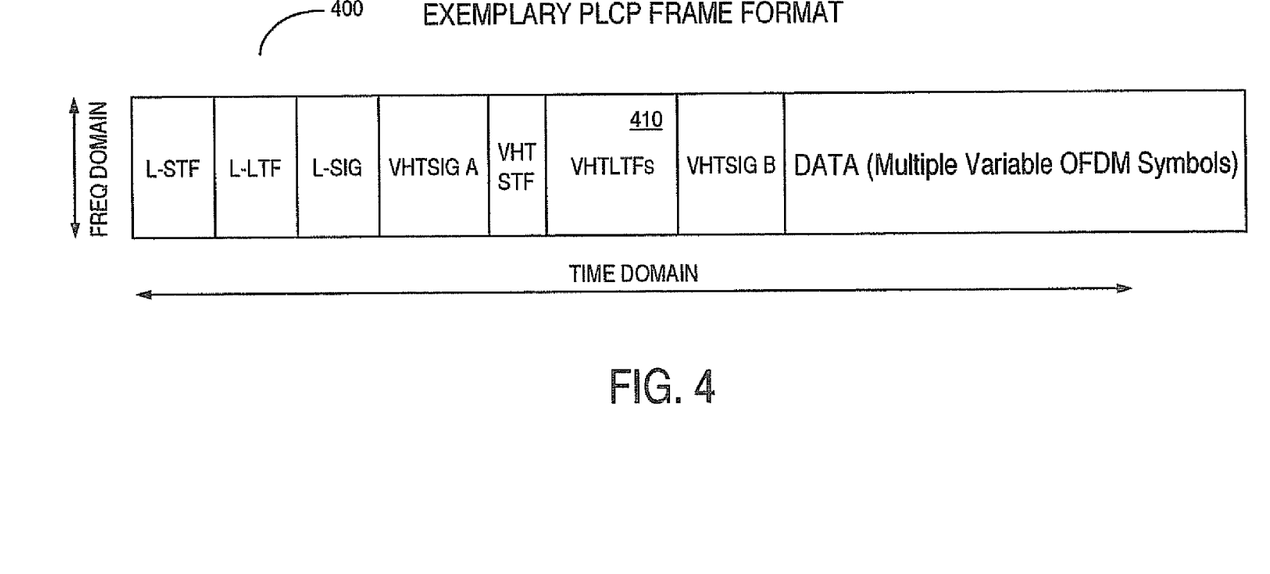
FIG. 4 is a block diagram of a higher level node to node wireless communication using channel estimation matrix for characterizing reception at each node based on transmitted information from the other node.

As part of the demodulation, the pilot tones in the preamble are subjected to special processing. FIG. 4 is an exemplary representation of a possible Physical Layer Convergence Protocol (PLCP) frame 400. The frame consists of payload data packed as OFDM symbols as well as preamble information. Part of the preamble information are the training sequences classified as "L" type for legacy and as "VHT" type for the newly defined training sequences peculiar to new developing standards. One such training field is VHT-LTF (very-high throughput long-training-field) 410. In a M by N MIMO system, the preamble will have N VHT-LTFs. These symbols, like data symbols, include a mix of known training sequences at the position of pilot tones (predefined data) and data tones. As described earlier, the OFDM transmit processor pre-pends the preamble in front of the packet data as part of formation of the "to be modulated" symbols.

In the wireless standards up to 802.11n, the pilot tones in the LTFs are predefined for multiple space time but changing between the LTF streams (STS) which change across LTFs for 1, 2 and so on to L where L is the number of STS. Such a variation over time and spatial domain removes the possibility of using the pilot tones in the LTFs for phase estimation and correction. As one embodiment of the invention, it is proposed that the pilot tones embedded in the VHT-LTFs be the same for space time streams. As an exemplary embodiment, the P matrix (MIMO training cover sequence) is replaced by the R matrix (receive signal matrix) wherein all rows of R matrix are identical to $1^{st}$ row of P matrix. To avoid unintentional transmit beam forming, a per-stream cyclic shift delay (CSD) is still applied to all streams after the R mapping of the pilot tones of the VHT-LTFs before applying per stream cyclic shift delay. This constancy is exploited by the invention to predict a one dimensional channel estimation from the first VHT-LTF. Other VHT-LTFs are used to perform phase estimation and the derived information is immediately applied to correct phase of received LTFs at data tones. In the end, all VHT-LTFs are phase corrected. The phase error information is fully consolidated to get and is applied to the data tones in the data symbols for correction. This information is also used as one set of information for channel estimation and determination of matrix $H_{AB}/H_{BA}$ at the data tones.

In FIG. 2, on the receive side, this is illustrated by an added block between the OFDM demodulator 275 and receive spatial processor 270, referred to herein as the phase tracker block 280. After receiving information from receive transceivers 265, via the receive spatial processor 270, the phase tracker block 280 along with demodulator 275, perform channel estimation 285 which is fed into downstream receive processing 295.

Figure 5:
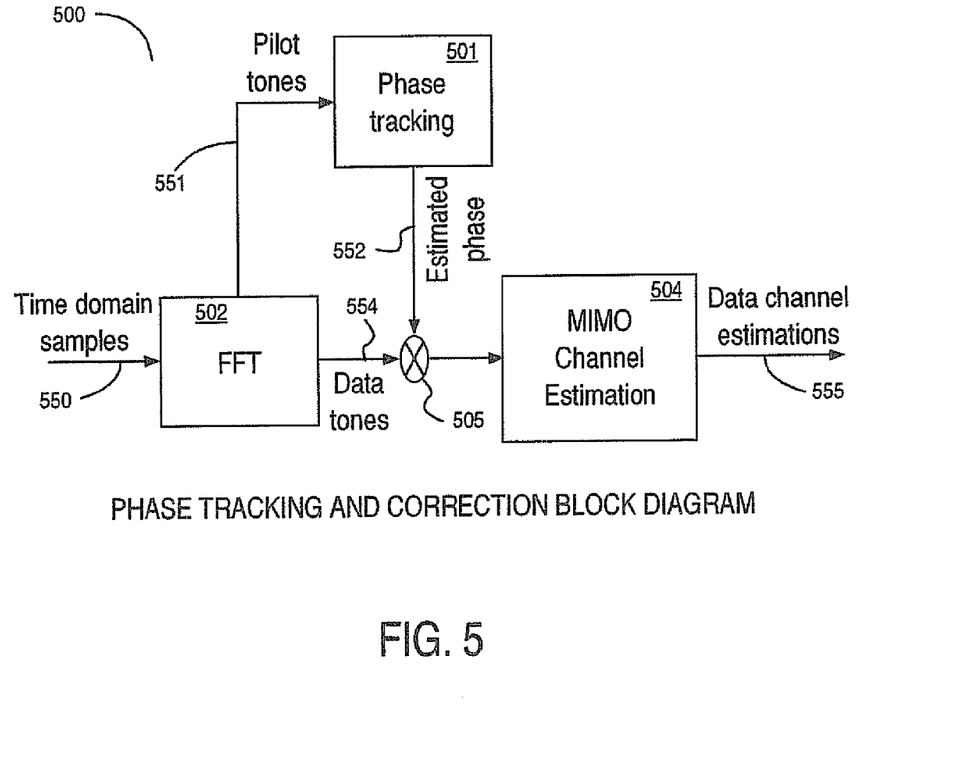
FIG. 5 is a hardware block diagram of the phase tracking and correction blocks coupled to the Fast Fourier Transform (FFT) component at reception, according to embodiments of the present invention.

The hardware components of the phase tracker block 500 are shown in FIG. 5. The received time domain stream 550 is converted into the frequency domain through a Fast Fourier Transform processor 502. The post processed pilot tone information is fed to a phase tracker 501. The phase tracker is disabled during a first VHT-LTF and is enabled until reception of the last VHT-LTF. Performing a channel estimation without using the P matrix (training cover sequence matrix), phase correction information is generated and consolidated using the pilot tones in the VHT-LTFs.

The estimated phases conveyed on 552 are multiplied 505 by data tone stream 552 to be fed into the channel estimation block 504. Data channel estimation information is generated on 555 to be conveyed to downstream receive processing. Due to added phase correction on data symbols, the channel estimation is more accurate and less error prone. Such estimation information when used at this node and a plurality of other nodes through handshaking and calibration, improves the overall wireless network performance.

Figure 6:
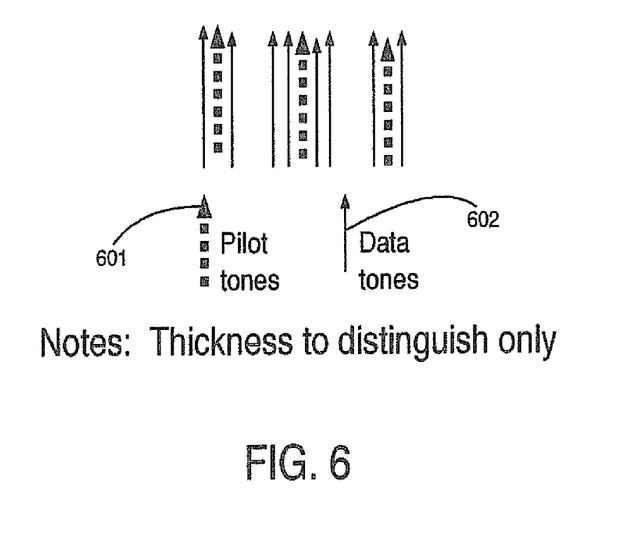
FIG. 6 is an illustration of meshed pilot tones and data tones in OFDM symbols, according to embodiments of the present invention.

FIG. 6 illustrates intermingling of pilot tones 601 and data tones 602 in OFDM symbols. The phase estimation information is applied immediately to all data tones for correction.

It is assumed that the OFDM system is L dimensional and involves Long Training Fields 1 through L. During the first VHT-LTF, the pilot tones embedded are used to estimate the pilot communication channel in a one dimensional (single stream) way. Mathematically, after Fast Fourier Transform, the receive signal in frequency domain is modeled as:

$$r_{n,l}(k) = \exp(j\theta_l) \cdot s(k) \cdot \sum_{m=1}^{M} h_{n,m}(k) p_{m,l} \quad \text{(Equation 1)}$$

In equation 1, k is the index of tone in the particular OFDM symbol, l is the index of the OFDM symbol. The MIMO system is M by N dimensional, implying that the transmitter has M antennas and receiver has N antennas, where the corresponding indices are m and n respectively. The index m ranges from 1 to M and the index n ranges from 1 to N. For the m transmitter and $n^{th}$ receiver, the channel response is represented mathematically as $h_{n,m}(k)$ for tone k. s(k) is the channel training sequence at the $k^{th}$ data tone while $\theta_l$ is the phase rotation for the $l^{th}$ symbol. $p_{m,l}$ is the MIMO training cover sequence at $m^{th}$ transmit antenna and $l^{th}$ OFDM symbol. P, defined as $P=[p_{m,l}]$ is the entire MIMO training cover sequence.

Result wise, $r_{n,l}(k)$ represents the received samples of $n^{th}$ receive antenna at the $k^{th}$ tone of the $l^{th}$ OFDM symbol. Accordingly, $R_l(k)=\lfloor r_{1,l}(k) r_{2,l}(k) \Delta r_{N,l}(k) \rfloor$ is the entire receive signal vector.

In one embodiment of the present invention, to track phase during VHT-LTFs, MIMO training cover sequence $P_{m,l}$ is not used at pilot tones. Accordingly, deriving from Equation 1, receive pilot tones after FFT can be modeled by:

$$r_{n,l}(k) = \exp(j\theta_l) \cdot s(k) \sum_{m=1}^{M} h_{n,m}(k) \quad \text{(Equation 2)}$$

where index k stands for the index of pilot tones. Due to missing P, only one dimensional channel is estimated at pilot tones.

$$h_n(k) = \sum_{m=1}^{M} h_{n,m}(k) \quad \text{(Equation 3)}$$

Step 1: At first VHT-LTF, for each pilot tone k, one dimensional channel H(k) is estimated as:

$$\hat{h}(k) = r_{n,1}(k)/s(k) \quad \text{(Equation 4)}$$

Step 2: For VHT-LTF 1 to l, phase rotation is estimated based on each of the pilot tones as:

$$\hat{\theta}_l = \sum_{k \in \{pilot\ tones\}} \sum_{n=1}^{N} r_{n,l}(k) \cdot \hat{h}_n(k) \quad \text{(Equation 5)}$$

Step 3: For data tones for VHT-LTF 1 to l, Equation 5 is used to correct the phase of received (RX) data tones as:

$$\tilde{r}_{n,l}(k) = r_{n,l}(k) \cdot \hat{\theta}_l \quad \text{(Equation 6)}$$

Essentially, the $k^{th}$ data tone vector is corrected using the phase estimation from the pilot tones. These steps end with the $l^{th}$ VHT-LTF.

In one embodiment of the present invention, for the balance of the data tones, MIMO channel estimation is calculated using the P matrix and the phase correction matrix for each 1 to M antenna to each 1 to N antenna according to the equation:

$$\hat{H} = \tilde{R} \cdot P^T (P \cdot P^T)^{-1} \quad \text{(Equation 7)}$$

where
$\hat{H}(k)=[\hat{h}_{n,m}(k)]$: MIMO channel estimation at k-data tone
$\tilde{R}(k)=[\tilde{r}_{n,m}(k)]$: received signal matrix with phase correction at $k^{th}$ data tone.

In one embodiment of the present invention, the channel estimation matrix is a function of the receive vector for the $k^{th}$ tone and the corresponding phase correction applied with derived information from the pilot tones in the VHT-LTFs. With this correction and the use of channel estimation so derived, the receive signal to noise ratio is seen to increase due to cancellation of both linear and non-linear phase errors.

Figure 7:
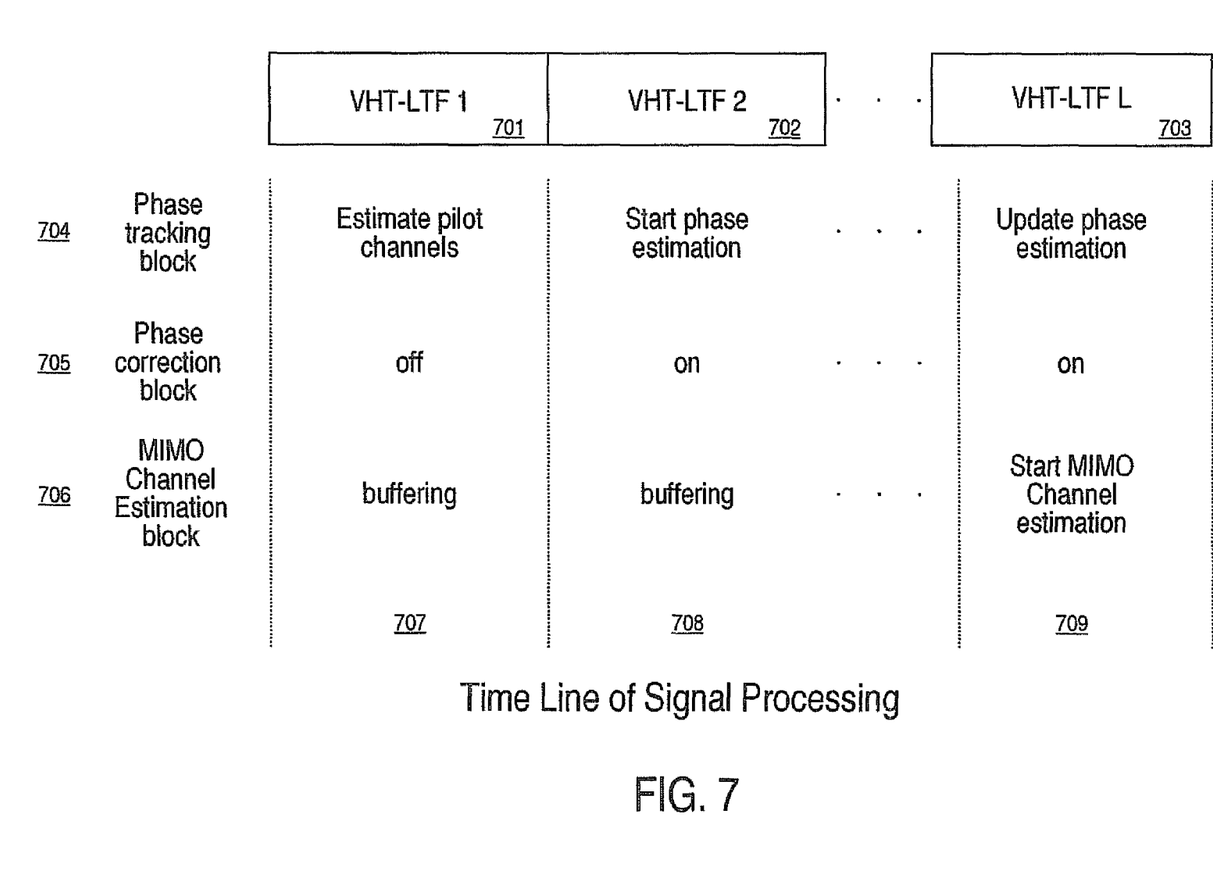
FIG. 7 is a timeline diagram of signal processing in various hardware blocks involved in extracting phase error information from pilot tones and using the information n to correct phase rotation in data tones, according to embodiments of the present invention.

FIG. 7 illustrates the timeline of signal processing involved in the phase tracking and correction based on the VHT-LTFs. In one embodiment of the present invention, during the first VHT-LTF 701, phase tracking block 704 is involved in the one dimensional estimation of the channel, the phase correction is off and the MIMO channel estimation block 706 is in the buffering phase 707. During the second 702 to L-1 VHT-LTF 708, the phase tracking block estimates the phase and phase correction for data tones is enabled. The channel estimation block 706 remains in the buffering mode. During the $L^{th}$ VHT-LTF 703, the phase estimation ends, the phase correction 705 for data tones continues and the MIMO channel estimation is enabled at the end of 709.

Figure 8:
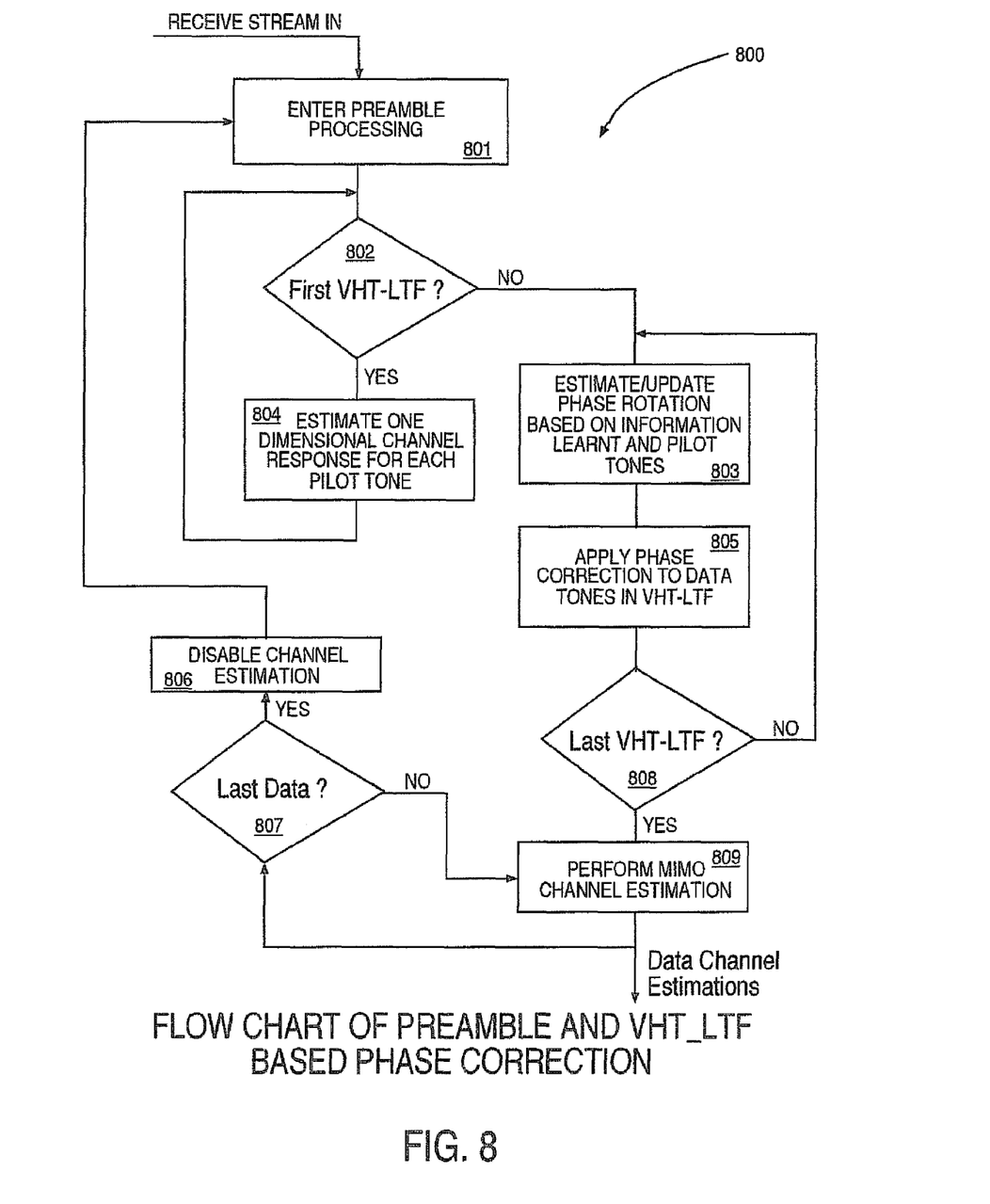
FIG. 8 is a flow chart representation of phase tracking using pilot tones in the VHT-LTFs of the preamble, estimation of phase errors and its use in correcting the data tones prior to channel estimation, according to embodiments of the present invention.

FIG. 8 captures the above steps in terms of a flow chart 800. In one embodiment of the present invention, the receive stream derived from the radio frequency transceivers after reception from the antenna is fed to receive spatial processors. After processing from the spatial processors, the stream enters the phase tracker and OFDM demodulator block where the preamble processing takes place 801. If decision block 802 determines a first VHT-LTF, for each of its pilot tones, the one dimensional receive channel is estimated without use of P matrix as the coverage sequence matrix for the pilot tones has identical values 804. If decision block 802 determines a non-first VHT-LTF, blocks 803 and 805 perform estimation for pilot tones and phase correction for data tones, which is continued through decision block 808 until the last VHT-LTF.

For the data symbols, channel estimation is performed 809 till the last data symbol in the frame through decision block 807 after which the channel estimation is disabled 806 and preamble processing begins for the next frame through reentry into 801. The end product of the steps is a more accurate channel estimation matrix for the m by n dimension which is used by downstream receive processing and for handshaking with other nodes.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A phase tracking reception method for a wireless communication system, the method comprising:
    initiating processing of a preamble of a wireless frame received by multiple space time streams, the preamble including a plurality of very high throughput long training fields (VHT-LTFs), each of the VHT-LTFs including pilot tones and data tones, wherein the pilot tones are the same for the multiple space time streams;

for a first VHT-LTF of the plurality of VHT-LTFs, estimating a first one dimensional channel response for each of the pilot tones of the first VHT-LTF;
for a second VHT-LTF of the plurality of VHT-LTFs, estimating a second one dimensional channel response for each of the pilot tones of the second VHT-LTF;
estimating a first phase rotation in response to the first and second one dimensional channel responses; and
applying a phase correction to the data tones of the second VHT-LTF in response to the first phase rotation, thereby generating a plurality of corrected data tones for a downstream processing.

2. The method of claim 1 wherein the downstream processing comprises calculating a channel estimation for a plurality of receive and transmit antennas using the plurality of corrected data tones.

3. The method of claim 1 further including modeling pilot tones by computing:

$$r_{n,1}(k) = \exp(j\theta_1) \cdot s(k) \sum_{m=1}^{M} h_{n,a}(k)$$

wherein $\theta_1$ is a phase rotation, of an OFDM long training symbol, k is an index of a tone, s(k) is a channel training sequence, M is a number of transmitters in the wireless communication system, m is an index of a transmitter in the wireless communication system, n is an index of a receiver in the wireless communication system, and h is a channel response.

4. The method of claim 3 wherein the estimating the one dimensional channel response for each pilot tone includes computing:

$$\hat{h}_n(k) = r_{n,1}(k)/s(k)$$

and the estimating the first phase rotation based on all estimated one dimensional channel responses include computing:

$$\hat{\theta}_1 = \sum_{k \in \{pilot\ tones\}} \sum_{n=1}^{N} r_{n,1}(k) \cdot \hat{h}_n(k)$$

wherein n is an index of a receiver in the wireless communication system, and N is a number of receivers in the wireless communication system.

5. The method of claim 4 wherein the applying the phase correction includes computing:

$$\tilde{r}_{n,l}(k) = r_{n,l}(k) \cdot \hat{\theta}_1.$$

6. The method of claim 5 wherein a the downstream processing includes computing:

$$\hat{H} = \tilde{R} \cdot P^T (P \cdot P^T)^{-1}$$

wherein $\tilde{R}$ is a received signal matrix with phase correction, P is a multiple-input multiple-output (MIMO) training cover sequence, and $P^T$ is a matrix transposition of P.

7. The method of claim 1, further comprising:
for a third VHT-LTF of the plurality of VHT-LTFs, estimating a third one dimensional channel response for each of the pilot tones of the third VHT-LTF;
estimating a second phase rotation in response to the first, second and third estimated one dimensional channel responses; and
applying a second phase correction to the data tones of the third VHT-LTF in response to the second phase rotation, thereby generating a second plurality of corrected data tones for the downstream processing.

8. The method of claim 1, wherein a MIMO training cover sequence is not applied to the pilot tones.

9. The method of claim 1, wherein a receive signal matrix (R matrix) is applied to the pilot tones, wherein all rows of the R matrix are identical.

10. A wireless communication apparatus comprising:
a plurality of antennas operable for receiving and transmitting signals, wherein the signals are partitioned into frequency bins;
a transmit chain coupled to the antennas;
a receive chain coupled to the antennas, wherein the receive chain is configured to process preambles of a wireless frame received by multiple space time streams, each preamble including a plurality of very high throughput long training fields (VHT-LTFs), each of the VHT-LTFs including pilot tones and data tones, wherein the pilot tones are the same for the multiple space time streams, wherein the receive chain comprises:
a first circuit for estimating a first one dimensional channel response for each of the pilot tones of a first VHT-LTF of the plurality of VHT-LTFs, and estimating a second one dimensional channel response for each of the pilot tones of a second VHT-LTF of the plurality of VHT-LFTs;
a second circuit for estimating a first phase rotation in response to the first and second one dimensional channel responses; and
a third circuit for applying a phase correction to the data tones of the second VHT-LTF in response to the first phase rotation, thereby generating a plurality of corrected data tones for a downstream processing circuit.

11. The apparatus of claim 10 wherein the downstream processing circuit is configured to calculate a channel estimation for a plurality of receive and transmit antennas using the plurality of corrected data tones.

12. The apparatus of claim 10 wherein the first circuit is configured to model pilot tones by computing:

$$r_{n,1}(k) = \exp(j\theta_1) \cdot s(k) \sum_{m=1}^{M} h_{n,m}(k)$$

wherein $\theta_1$ is a phase rotation, of an OFDM long training symbol, k is an index of a tone, s(k) is a channel training sequence, M is a number of transmitters in the wireless communication apparatus, m is an index of a transmitter in the wireless communication apparatus, n is an index of a receiver in the wireless communication apparatus, and h is a channel response.

13. The apparatus of claim 3 wherein the first circuit is further configured to estimate the one dimensional channel response for each pilot tone includes computing:

$$\hat{h}(k) = r_{n,1}(k)/s(k)$$

and the second circuit is further configured to estimate the first phase rotation based on all estimated one dimensional channel responses include computing:

$$\hat{\theta}_1 = \sum_{k \in \{pilot\ tones\}} \sum_{n=1}^{N} r_{n,1}(k) \cdot \hat{h}_n(k)$$

wherein n is an index of a receiver in the wireless communication apparatus and N is a number of receivers in the wireless communication apparatus.

14. The apparatus of claim 13, wherein the third circuit is further configured to apply the phase correction by computing:

$$\tilde{r}_{n,l}(k) = r_{n,l}(k) \cdot \hat{\theta}_l.$$

15. The apparatus of claim 14 wherein the downstream processing circuit is configured to compute:

$$\hat{H} = \tilde{R} \cdot P^T (P \cdot P^T)^{-1}$$

wherein $\tilde{R}$ is a received signal matrix with phase correction, P is a multiple-input multiple-output (MIMO) training cover sequence, and $P^T$ is a matrix transposition of P.

16. The wireless communication apparatus of claim 10 wherein the transmit chain comprises:
a circuit configured for compiling a transmission data stream;
a circuit configured for distributing a preamble and a payload from the compiled transmission data stream into a plurality of parallel spatial streams, wherein a set of identical information is mapped to the preamble in the plurality of parallel spatial streams for estimating a set of channel characteristics and a phase error on reception; and
a circuit configured for transmitting the plurality of parallel spatial streams using a plurality of radio frequency transceivers.

17. The wireless communication apparatus of claim 16 wherein the set of identical information mapped to the preamble comprises a single stream of pilot tones mapped for the plurality of parallel spatial streams.

18. The apparatus of claim 10, wherein
the first circuit is further configured for estimating a third one dimensional channel response for each of the pilot tones of a third VHT-LTF of the plurality of VHT-LTFs,
the second circuit is further configured for estimating a second phase rotation in response to the first, second and third estimated one dimensional channel responses, and
the third circuit is further configured for applying a second phase correction to the data tones of the third VHT-LTF in response to the second phase rotation, thereby generating a second plurality of corrected data tones for the downstream processing circuit.

* * * * *

UNITED STATES PATENT AND TRADEMARK OFFICE
CERTIFICATE OF CORRECTION

PATENT NO. : 8,494,075 B2
APPLICATION NO. : 12/869521
DATED : July 23, 2013
INVENTOR(S) : Kai Shi et al.

It is certified that error appears in the above-identified patent and that said Letters Patent is hereby corrected as shown below:

In the Claims

Column 9

Claim 3, Line 20, change " $r_{n,1}(k) = \exp(j\theta_1) \cdot s(k) \sum_{m=1}^{M} h_{n,a}(k)$ "

to -- $r_{n,1}(k) = \exp(j\theta_1) \cdot s(k) \sum_{m=1}^{M} h_{n,m}(k)$ --.

Claim 3, Line 25, change "rotation," to --rotation--.
Claim 4, Line 38, change "include" to --includes--.

Column 10
Claim 12, Line 52, change "rotation," to --rotation--.
Claim 13, Line 59, change "3" to --12--.
Claim 13, Line 61, change "includes" to --by--.
Claim 13, Line 65, delete "further".
Claim 13, Line 66, delete "first".
Claim 13, Line 67, change "include" to --by--.

Signed and Sealed this
Twentieth Day of May, 2014

Michelle K. Lee
*Deputy Director of the United States Patent and Trademark Office*